US006221433B1

(12) United States Patent
Muntz et al.

(10) Patent No.: US 6,221,433 B1
(45) Date of Patent: *Apr. 24, 2001

(54) SILOXANE AUTOMOTIVE PROTECTANT COMPOSITIONS

(75) Inventors: Ronald Lee Muntz, Adrian; Michael Dean Lowery; Bryan Eric Fry, both of Tecumseh, all of MI (US)

(73) Assignee: Wacker Silicones Corporation, Adrian, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/065,744

(22) Filed: Apr. 24, 1998

(51) Int. Cl.$^7$ .................. C08K 5/54; C09D 183/04; B05D 3/02
(52) U.S. Cl. .................. 427/387; 106/287.13; 106/3; 524/269
(58) Field of Search .................. 106/3, 287.13; 524/269; 427/387

(56) References Cited

U.S. PATENT DOCUMENTS

| | | |
|---|---|---|
| 2,955,047 | 10/1960 | Terry . |
| 3,429,842 | 2/1969 | Wolstoncroft . |
| 3,457,173 | 7/1969 | Pater . |
| 3,527,723 | 9/1970 | Stroh et al. . |
| 3,544,498 | 12/1970 | Holdstock et al. . |
| 3,553,123 | 1/1971 | Behnke . |
| 3,624,015 | 11/1971 | Vaughn et al. . |
| 3,801,572 | 4/1974 | Berger . |
| 3,817,889 | 6/1974 | Fink et al. . |
| 3,956,174 | 5/1976 | Palcher . |
| 4,133,921 | 1/1979 | Palcher . |
| 4,230,605 | 10/1980 | Connolly et al. . |
| 4,246,029 | 1/1981 | Sanders . |
| 4,247,330 | 1/1981 | Sanders . |
| 4,273,584 | 6/1981 | D'Angelo et al. . |
| 4,347,333 | 8/1982 | Lohr . |
| 4,462,828 | 7/1984 | Otsuki . |
| 4,509,981 | 4/1985 | Sanders . |
| 4,518,727 | 5/1985 | Traver . |
| 4,525,502 | 6/1985 | Traver . |
| 4,529,758 | 7/1985 | Traver . |
| 4,592,934 | 6/1986 | Wolstoncroft . |
| 4,600,436 | 7/1986 | Traver . |
| 4,618,689 | 10/1986 | Traver . |
| 4,661,577 | 4/1987 | Lane . |
| 4,705,704 | 11/1987 | Lane . |
| 4,757,106 | 7/1988 | Mayer et al. . |
| 4,784,844 | 11/1988 | Thimineur . |
| 4,837,261 | 6/1989 | Hampe et al. . |
| 4,898,614 | 2/1990 | Halloran et al. . |
| 4,936,914 | 6/1990 | Hurley et al. . |
| 4,997,478 | 3/1991 | Gordon . |
| 5,025,054 | 6/1991 | Yoshida et al. . |
| 5,043,012 | 8/1991 | Shinohara et al. . |
| 5,098,745 | 3/1992 | Gordon . |
| 5,112,394 | 5/1992 | Miller . |
| 5,326,387 | 7/1994 | Faber . |
| 5,433,890 | 7/1995 | Meyer et al. . |
| 5,486,566 | 1/1996 | Katsoulis . |
| 5,492,691 | 2/1996 | Bahr et al. . |
| 5,514,419 | 5/1996 | Popa et al. . |
| 5,518,533 | 5/1996 | Howe . |
| 5,531,814 | 7/1996 | Bahr . |
| 5,629,273 | 5/1997 | Hauenstein . |
| 5,693,704 | * 12/1997 | Estes ......................... 524/506 |
| 5,866,532 | * 2/1999 | Jackson et al. ................ 510/466 |
| 5,913,969 | * 7/1999 | Howe ........................... 106/2 |

FOREIGN PATENT DOCUMENTS

| | | |
|---|---|---|
| 1176828 | 10/1984 | (CA) . |
| 298 09 172 U 1 | 8/1998 | (DE) . |
| 0 239 084 | 9/1987 | (EP) . |
| WO96/02600 | 2/1996 | (WO) . |
| WO96/06907 | 3/1996 | (WO) . |
| WO99/10464 | 3/1999 | (WO) . |
| WO99/42534 | 8/1999 | (WO) . |

* cited by examiner

*Primary Examiner*—Robert Dawson
*Assistant Examiner*—Jeffrey B. Robertson
(74) *Attorney, Agent, or Firm*—Brooks & Kushman P.C.

(57) ABSTRACT

Gloss and ease of application of sprayable aqueous organopolysiloxane vinyl protectant emulsions are both improved by the addition of a gloss-improving additive. Protectants may be formulated to achieve higher gloss with the same amount of active organopolysiloxane or the same or higher gloss with less organopolysiloxane. Preferred gloss-improving additives are water soluble organic viscosifiers and/or minor amounts of inorganic, viscosity-increasing particulate solids.

40 Claims, 6 Drawing Sheets

SILOXANE AUTOMOTIVE PROTECTANT COMPOSITIONS

TECHNOLOGICAL FIELD

The present invention pertains to sprayable siloxane-containing protectant compositions used to enhance gloss and aid in protecting vinyl and other substrates. More particularly, the present invention pertains to protectant compositions which are aqueous polyorganosiloxane emulsions which may contain less polyorganosiloxane but yet which result in comparable or higher gloss as compared to commercial formulations.

DESCRIPTION OF THE RELATED ART

Polysiloxane-based automotive protectants are now established products in the marketplace. By the term "automotive protectants" is meant those products which are applied to vinyl, leather, plastics, rubber, and other visible surfaces of automobiles, trucks, and other vehicles to improve the gloss of such surfaces, and also to protect such surfaces from the damaging effects of sunlight, heat, moisture, etc. Although described as "automotive protectants", the term "automotive" is not meant as a restriction on the use of these compositions, which may be equally useful on boats, trains, planes, outdoor furniture, etc., and also for a variety of interior uses. Protectant compositions are generally not applied to textiles, nor to glass or painted surfaces, the latter of which tend to have a greasy appearance if so treated. The term "automotive" is descriptive of the market where such products first evolved, and which remain the largest market.

In use, automotive protectants are applied to a substrate desired to be "protected" such as a car seat, dashboard, arm rest, etc., and rubbed with a cloth. The protectant may be sprayed directly onto the surface to be treated, or may be first sprayed onto a cloth, pad, or the like. As a result of this application, the gloss of the substrate is enhanced considerably. Evaporation of the aqueous continuous phase leaves an organopolysiloxane coating which may, in some cases, penetrate polymer substrates, ameliorating loss of plasticizers from such surfaces due to exposure to sun and heat. The protectants are often formulated with UV absorbers as well, and the net effect is not only a restoring of the "as new" look to the vehicle or other product, but also in a general prolonging of life of substrates, e.g. dashboards to which the protectant has been applied.

While lotion and paste-type protectants are available, these have not met the acceptance of sprayable formulations, due not only to their increased difficulty in application to the surface, but also due to their propensity to leave a buildup of protectant at seams, crevices, and on highly textured surfaces such as crushed leather-like vinyl. Examples of such paste and lotion-type protectants are provided by U.S. Pat. No. 5,433,890, wherein protectants containing both an aminofunctional organopolysiloxane and a polydimethylsiloxane, a film forming polymer to increase abrasion resistance, and morpholine, necessary to activate the film forming polymer are disclosed. These protectants must be left on the surface for a considerable period before wiping off the excess, and maximum effectiveness is achievable only with a second coating. The disadvantages of such preparations are readily apparent.

In Canadian published application CA 1,176,828, paste-type, organopolysiloxane emulsion-based polishes which contain a silicone-soluble UV absorbent are disclosed. These polishes have a high proportion of organopolysiloxane, greater than 20 weight percent solids, and an organic thickening agent which provides the paste-like character of the polish and serves to maintain the high level of silicone solids uniformly dispersed. However, these compositions are not sprayable, and therefore suffer the drawbacks of other pastes, creams, and lotions. Moreover, they contain a high proportion of relatively expensive organopolysiloxane.

The active ingredients of automotive protectants are organopolysiloxanes. Organopolysiloxanes are relatively expensive, and a typical protectant may contain from 20 weight percent to 40 weight percent organopolysiloxane as an aqueous emulsion. Non-aqueous preparations containing organic solvents or aqueous preparations containing dispersed organic solvents are undesirable both due to the lingering odors associated with these solvents, but also on environmental grounds. Despite the relatively high amount of organopolysiloxane, studies demonstrate that only a relatively small amount, i.e. 10% to 20% of what is applied, actually ends up on the substrate. It would be desirable to be able to lower the amount of organopolysiloxane in automotive protectants without lowering performance, or to obtain increased performance at the same level of active ingredient. Even with the same organopolysiloxane content, improved performance may allow the application rate to be lowered, resulting in greater economy to the purchaser.

SUMMARY OF THE INVENTION

It has now been surprisingly discovered that the amount of organopolysiloxane in sprayable aqueous automotive protectants can be lowered significantly without decreasing performance, when certain gloss-improving additives are included in the formulation. Most surprisingly, although containing less active ingredient, the gloss exhibited by the subject formulations may be the same or higher than the gloss exhibited by commercial compositions, while maintaining sprayability. Compositions containing similar amounts of organopolysiloxane but having improved gloss may also be formulated.

DESCRIPTION OF THE PREFERRED EMBODIMENTS

The subject invention compositions are sprayable, aqueous organopolysiloxane emulsions. The organopolysiloxanes useful are organopolysiloxane fluids having neat viscosities from about 10 cSt to about 1,000,000 cSt, and preferably, from about 50 cSt to about 100,000 cSt. Both less and more viscous organopolysiloxanes may be useful for particular applications, and mixtures of organopolysiloxanes of both low and high viscosities may be particularly effective. The organopolysiloxanes may be poly(dialkyl)siloxanes such as polydimethylsiloxanes, or organopolysiloxanes containing functional groups such as aminoalkyl groups and ethylenically unsaturated groups. In general, such organopolysiloxanes may consist of organopolysiloxanes corresponding to the formula $$[R_a SiO_{(4-a)/2}]_n \qquad (1)$$

where:

R is independently a monovalent hydrocarbon radical having from 1 to 18 carbon atoms, an hydroxy radical or a hydrocarbonoxy radical having from 1 to 18 carbon atoms or radicals containing, for example, amino, mercapto, olefinic, or aromatic functional groups;

a is on average from 0.7 to 2.6 per unit of the organopolysiloxane of formula (1), and n is from 10 to 10,000.

Thus, both branched and linear organopolysiloxane fluids are suitable. Further examples of organopolysiloxane fluids are those having repeating (2)

units, in which $R^1$ and $R^2$ are individually $C_{1-8}$ alkyl or phenyl groups, preferably methyl groups, and in some cases, aminoalkyl groups such as, but not limited to, ω-amino-$C_{1-8}$ alkyl or polyaminopolyalkyl groups such as aminoethylaminopropyl groups, and salts thereof; and unsaturated groups such as vinyl, allyl, propenyl, isopropenyl, and terminal $C_{4-18}$ alkenyl. Alkynyl groups, vinyl ether groups, allyl ether groups, and the like may all be useful. The organopolysiloxanes may also carry $C_{1-8}$ alkoxy groups, preferably methoxy and ethoxy groups. The organopolysiloxanes may be terminated with conventional end groups, such as trialkylsilyl, dialkylsilanolyl, dialkylalkoxysilyl, alkyldialkoxysilyl, dialkylvinylsilyl, and the like. This list of organopolysiloxane fluids is illustrative and not limiting.

More generally, the organopolysiloxanes are those which can be readily dispersed to form aqueous emulsions, and which are stable to gelation in the aqueous composition. Preferred are polydimethylsiloxanes end-capped with dimethylsilanolyl groups, or more preferably, trimethylsilyl groups. Polydimethylsiloxanes which are lightly or modestly branched are also preferred. A further category of preferred organopolysiloxanes are aminoalkyl-functional and polyaminopolyalkyl-functional polydimethylsiloxanes having terminal, pendant, or both terminal and pendant aminoalkyl or polyaminopolyalkyl groups. Mixtures of various organopolysiloxanes may be used as well, particularly mixtures of organopolysiloxanes of differing viscosities, for example, mixtures of low and high viscosity siloxanes, for example, mixtures of siloxanes having viscosities in the ranges of 10 cSt to 10,000 cSt and 1000 cSt to 1,000,000 cSt, with the siloxane in latter range being of higher viscosity than that in the former range. Resinous organopolysiloxanes are not suitable for use as the major active ingredient of protectants, and thus their use is not preferred. However, minor amounts of such organopolysiloxane resins relative to total organopolysiloxane may be added to improve durability.

The organopolysiloxanes are employed in the form of an aqueous emulsion, preferably one having relatively small particle size, for example in the range of 10 nm to 1000 nm, more preferably in the range of 100 nm to 800 nm, and most preferably in the range of 200 nm to 450 nm.

Organopolysiloxane emulsions are prepared in the conventional manner, and concentrated as well as dilute organopolysiloxane emulsions are commercially available. For example, Silicone Fluid Emulsions E10, E103P, E1044, E125P, E1656, E677, E60-350, E60-1000 and others, are available from Wacker Silicones, Adrian, Mich., and from Wacker-Chemie GmbH, Munich, Germany. The emulsions of the subject invention may start with commercial emulsions to which the remaining ingredients are added, or may be prepared by mixing and emulsifying neat organopolysiloxane with the aid of suitable surfactants, and optionally including ingredients such as U.V. protectants, plasticizers, etc. Such emulsions generally contain from 40 to 70 weight percent organopolysiloxane, and are diluted with additional water for use. Glycols such as propylene glycol, ethylene glycol, or low molecular weight polyols such as glycerine, etc., may be added during the initial emulsion preparation to ensure a stable, readily dispersible emulsion concentrate.

Suitable surfactants include such non-ionic surfactants as various oxyethylated $C_{1-18}$ alkanols, oxyalkylated alkylphenols, and the like. Anionic and cationic surfactants are also useful, e.g. dioctylsodiumsulfocuccinate, alkylsulfonates, etc. Preferred emulsifiers include the various oxyethylated medium chain length fatty alcohols, such as those having from 10 to 18 aliphatic carbon atoms and degrees of oxyethylation from about 3 to about 20. Suitable surfactants are well known to those skilled in the art. Reference may be had to MCCUTCHEONS'S, VOL. 1: EMULSIFIERS AND DETERGENTS, 1997 North American Edition, McCutcheon's Division, MC Publishing Co., Glen Rock, N.J.

The organopolysiloxane emulsions used herein are preferably stable emulsions with small particle size. By the term "stable" with respect to the emulsions is meant that the emulsions are free from separation for extended periods, in general with a room temperature shelf life of about 2 years or longer. Shelf life may be assessed by observation of the particle size after storage for one month at 50° C. In general, there should be less than a 20% increase in particle size over this period, more preferably less than a 10% increase. Particle size should be less than 450 nm. Stability can also be assessed by centrifuge tests. Stable emulsions should exhibit less than 1 inch of phase separation, more preferably less than 0.5 inch, and yet more preferably less than 0.2 inch. Most preferably, no phase separation is observed. Stable emulsions do not require additional surfactants, thickeners, or other additives over and above those initially used in the emulsification process to maintain freedom from separation or coalescence of the dispersed phase.

The protectants of the subject invention contain a gloss-improving additive. It has been surprisingly discovered that gloss-improving additives may be selected from inorganic thickening agents and watersoluble aqueous thickeners, present in exceptionally small amounts such that the protectants remain sprayable as that term is defined herein. Numerous thickeners in these categories have been tested, and all have been found to assist in improving gloss. Suitable glossimproving additives are preferably compositions which exhibit a modest increase in aqueous emulsion viscosity at low concentration. Examples of such water soluble additives are the various soluble polyacrylic acid and polyacrylic acid/polyacrylate copolymers, e.g. those available under the tradename Carbopol®; various polyacrylamides; associative polyethers such as polyoxyethylene and polyoxyethylene/polyoxypropylene copolymer polyethers capped with $C_{8-30}$ α-olefin oxides; the various vegetable gums, e.g. gum tragacanth, gum acacia, gum arabic, carageenan gum, xanthan gum, and the like, and the various cellulose ethers, for example carboxymethyl cellulose, hydroxypropyl cellulose, and like products. Among the inorganic, water-insoluble thickeners, the various clay minerals, e.g. bentonite, and fumed silica are also suitable. In this respect, reference may be made to MCCUTCHEON'S VOLUME 2: FUNCTIONAL MATERIALS, 1997 North American Edition, McCutcheon's Division, MC Publishing Co., Glen Rock, N.J.

When poly(carboxylic acid) and similar watersoluble thickeners are used, maximum gloss-improving effect is obtained when such thickeners are at least partially neutralized. For example, polyacrylic acid thickeners such as Carbopol™ polycarboxylic acids may be neutralized with bases such as alkali metal hydroxides, ammonia, organic amines, and preferably alkanolamines such as mono-, di-, and triethanolamine, the latter being particularly preferred. Surprisingly, the modest thickening ability of non-neutralized polyacrylic acid and similar thickeners results in measurable gloss improvement. However, the gloss improvement made possible with partially or fully neutralized thickeners is striking. Suitable neutralization may be obtained, without limitation, in compositions having pH between 6 and 8, preferably between 6 and 7. The polyacrylic acid-type water soluble gloss-improving additives are used in amounts such that aqueous viscosity is about 4000 cP or less. Amounts of water soluble glossimproving additives are thus quite small, and will vary somewhat with the thickening efficiency. For Carbopol 940, for example, amounts of less than 0.2 weight percent (solids) are useful, more particularly less than 0.1 weight percent. When 0.2 weight percent of more of this thickener is used, the compositions are cream or paste-like and are not sprayable.

When solid inorganic materials such as clay minerals are used, it is especially important that their concentration be minimized, otherwise a white coating may be found to accumulate in pores, folds, and other surface irregularities of the treated substrates. In general, the amounts of such thickeners must be less than 2 weight percent, preferably about 1 weight percent or less based on the total weight of the protectant. Polyacrylic acid additives, neutralized with bases such as alkali metal hydroxides or with organic amines, more preferably with alkanolamines, are preferred.

As indicated, the amount of gloss-improving additive is generally quite low, preferably an amount sufficient to increase viscosity by about 50% and more preferably from 100% to 200% or more, in aqueous dispersions containing from 10–20% active (organopolysiloxane), and generally sufficient additive to increase viscosity to the range of 50 cps to 4,000 cps, preferably from 50 cP to 2,000 cP, more preferably in the range of 50 cP to 1000 cP, and most preferably in the range of 50 cP to 500 cP. Higher viscosity formulations will not be sprayable. By the term "sprayable" is meant that the formulations herein can be sprayed or "misted" by means of conventional trigger-pump, manually-actuated spray bottles. Compositions which cannot be misted, but which can only exit the container nozzle as a coherent stream are not considered "sprayable" as that term is used herein. The amount of additive may range, in weight percent, from about 0.010 weight percent to about 1.0 weight percent or higher, in the case of inorganic gloss-improving additives, the various vegetable gums, cellulose ethers, and associative thickeners, and preferably 0.020 weight percent to about 0.2 weight percent, and more preferably from about 0.050 weight percent to about 0.1 weight percent for water soluble polycarboxylic acid thickeners.

As can be seen from the very low amounts of additives employed, increasing protectant viscosity is not the goal of the present invention. Rather, the goal is to maintain sprayability while achieving an increase in gloss and other desirable characteristics such as lightness, chroma, and weight gain by the substrate. Sprayable formulations require a viscosity of less than about 4,000 cps, a viscosity which may be reached with Carbopol® polyacrylates at a concentration of only about 0.1 to 0.15 weight percent. The amount of gloss-improving additive to achieve a viscosity of 250 cps, for example, is only about 0.075%. It is preferable that sprayable viscosities are limited to the ranges indicated above. The thickeners should not be confused with non-reinforcing fillers, which are added to products such as silicone gums and other siloxanes in large quantities, generally from 5% to 90% by weight. Such fillers cannot be used in the present invention, not only due to their relatively large particle size, but also as application onto a substrate would leave behind significant amounts of solid residue.

Plasticizers may be used in small amounts in the subject formulations. Suitable plasticizers include dialkylphthalates, triarylphosphates such as tricresylphosphate, epoxidized soybean oil, and a variety of liquid polymeric oligomers. Suitable plasticizers are well known. Examples of plasticizers may be found in Volume 2 of MCCUTCHEON'S, previously cited, on pages 235–241. The amount of plasticizer used should be small, preferably less than 10% by weight of the organopolysiloxane actives, more preferably 5% or less, and most preferably 1% or less.

Ultraviolet protectants may be included, e.g. various ultraviolet absorbing dyes, substituted and unsubstituted aminobenzoic acids and their esters, substituted cinnamic acid and its derivatives and esters such as Wacker Silicones F595 absorber, and like compounds well known to those skilled in the art. Up to about 10% by weight of the composition may comprise ultraviolet absorbers, preferably about 1–8% by weight. Suitable ultraviolet absorbers may be found in Volume 2 of MCCUTCHEON'S on pages 316–320.

The formulations may also contain microbicides such as fungicides, bateriacides, mildewcides, etc. in effective amounts. Suitable microbicides are, for example, KATHON® CG/ICP and TROYSAN® 395. Other microbicides are well known and commercially available, and a variety are listed in Volume 2 of McCutcheon's on pages 3–9. The formulation may also contain an antifoam agent. Examples of these may be found in Volume 2 of McCutcheon's on pages 100–125.

Wax is preferably excluded from all formulations. Small amounts of wax may be tolerated, particularly soft waxes and those of the microcrystalline type. However, larger amounts of wax increase the susceptibility to whitening after drying and also to lowering the gloss, particularly in the normal situation where extensive buffing is not to be done. Most preferably, wax is substantially excluded from the composition, i.e. the composition contains no wax or contains wax in such a small quantity that the composition has substantially the same characteristics, particularly after application, as an otherwise identical composition not containing wax. These characteristics may be measured by measuring the viscosity, which should be within 20% of the viscosity without wax, and by assessing the gloss and percent pickup, which should be substantially the same or lower than the characteristics obtained when wax is absent, or is present in such small quantities that it may be considered to have been substantially excluded.

It is preferable that the protectant be free of non-functional organic solvents. Non-functional organic solvents are those common solvents other than low molecular weight, relatively non-volatile glycols and polyols such as ethylene glycol, propylene glycol, diethylene glycol, glycerine, and the like, which are added to maintain or assist in maintaining a stable emulsion or which assist in the organosiloxane emulsifying process. Examples of non-functional solvents include aliphatic and aromatic hydrocarbons, naphtha, Stoddard solvents, kerosene, turpentine, mineral spirits, ligroin, petroleum ether, and the various solvents sold under the trade names NORPAR® and ISOPAR®. When such solvents are included, their amounts are preferably less than 2 weight percent, more preferably less than 1 weight percent.

It is also preferable that the protectant be free of film forming amounts of film forming polymers. Examples of such film forming polymer are water dispersible and generally water swellable non-soluble polyacrylate polymers such as those available under the trade name ACRYSOL™. Such polymers form a film, generally a crosslinked film, upon evaporation of water, particularly in the presence of a crosslinking catalyst or crosslinking monomer. Such polymers may cause a buildup of polymer film or scale, either on the substrate, e.g. at seam, crack, or crevice locations, or upon the spray bottle or applicator. As such film forming polymers form films by the coalescence of adjacent polymer domains, adding an amount of a film forming polymer in an amount insufficient to form a coherent film, i.e. less than 0.1 weight percent solids, would not depart from the spirit of the invention.

To assess the effectiveness of the protectants of the present invention, it is necessary to establish a baseline for comparison. Three commercial protectants (C1–C3), which together represent the major portion of the sprayable protectant market, were analyzed. Some of the physical and chemical characteristics are presented in Table 1 below and performance values are summarized in Table 2. A brief description of the test methods follows.

(1) Weight percent solids gives the total percentage of non-volatile components in a protectant. The test procedure is to accurately weigh a 2.000 gram sample of the protectant into an aluminum cup. The weighed cup is then placed into a 105° C. oven for two hours. The cup is then removed from the oven, cooled to room temperature, and then re-weighed. The percent solids is calculated as:

$$\text{percent solids} = (\text{final weight/initial weight}) \times 100\%. \tag{3}$$

(2) The mean particle size of a protectant emulsion is determined using commercial particle size analyzer either from NiComp Corporation (submicron particle sizer model 370) or Brookhaven Instruments Corporation (model Bl-90 particle sizer). Protectant emulsions are diluted for evaluation per the manufacturer's instructions with filtered, deionized water. The values reported in Table 1 are intensity weighted average particle sizes in nanometers (nm).

(3) A centrifuge stability test is used to assess the long-term stability of a protectant emulsion. An "unstable" emulsion will typically exhibit separation when subjected to the high g-force of a centrifuge. The procedure is to place approximately 50 ml of the protectant emulsion to be tested into a 50 ml centrifuge tube (i.e. from Nalgene Corporation) and securely place the tube in a IEC 822A 45° fixed angle rotor. The sample is then centrifuged for 1 hour at 2000 rpm. When the test is complete, the tube is evaluated for any separation (top or bottom). The degree of separation (if present) is reported in either inches (in) or millimeters (mm) and noted if the separation is on the top or bottom of the centrifuge tube.

(4) The specific gravity test gives the ratio of the density of the protectant emulsion of that of pure water. The test procedure requires the protectant emulsion to be equilibrated in a 25° C. temperature bath. The thermally equilibrated sample is then placed in a migetper-gallon cup (Gardner Laboratory) and the weight of the protectant accurately weighed (nearest 0.1 milligram). The procedure is repeated using purified water in place of the protectant. Specific gravity is determined using:

$$\text{Specific gravity (25° C.)} = (\text{weight of protectant})/(\text{weight of water}) \tag{4}$$

(5) The pH value gives an indication of the acidity (pH<7.0) or alkalinity (pH>7.0) of the protectant emulsion. A calibrated pH electrode (Corning model 140 or equivalent) is used on the neat protectant emulsion samples. A sufficient amount of time is allowed to insure that the pH reading (digital) has become constant and that value is recorded in Table 1.

(6) Viscosity values were determined using a Brookfield RVT viscometer with spindle #2 at 10 rpm. This allows a minimum viscosity of 40 cP (centipoise) to be measured. Values less than 40 cP were estimated. Samples were recorded at room temperature (approximately 25° C.).

TABLE 1

| Property: | Commercial Protectant | | |
| --- | --- | --- | --- |
| | C1 | C2 | C3 |
| Weight Percent Solids | 26 | 34 | 20 |
| Mean Particle Size (nm) | 309 | 453 | 571 |
| Centrifuge Stability (in) | 0.25 | 1.10 | 1.00 |
| Specific Gravity | 1.005 | 0.997 | 0.999 |

TABLE 1-continued

| | Commercial Protectant | | |
|---|---|---|---|
| Property: | C1 | C2 | C3 |
| pH | 8.10 | 8.4 | 7.57 |
| Viscosity (cP) | <10 | <10 | <10 |

Performance Test Procedure

To evaluate the effectiveness of a protectant emulsion, an unbiased test procedure needs to be developed and rigorously followed. We have chosen to utilize blue Ford interior vinyl as our primary substrate; however, other types and colors of vinyl have been tested with comparable results. For observables, we have selected to monitor the change in gloss (85° C.), lightness (*L), chroma (*C) and weight gain (milligrams) for treated vinyl sections.

The test procedure is as follows. The vinyl is cut into 6"×6" sections. Each section is numbered and its untreated gloss, *L, *C and weight are measured and recorded. Each gloss reading is an average of 10 independent measurements, and *L and *C values were an average of 5 independent measurements. Next, each vinyl section is treated with 0.70 ml of the candidate protectant accurately applied with a syringe. This quantity of protectant was selected based on the average use value obtained from in-house consumer preference studies (i.e. the average consumer applies 0.70 ml of protectant for a 6"×6" area). The protectant is then buffed for 20 seconds using a 4"×4" section of a clean cotton diaper that has been folded into quarters (i.e. 1"×1" cotton pad). Once buffed, the treated vinyl sections are then placed into a 50° C. oven for 1 hour to dry. After drying, each vinyl section is re-weighed and the gloss, *L and *C measurements taken (again, averages of 10 independent measurements).

For each protectant sample, this test procedure was repeated in triplicate. To minimize the effect of random variations in the vinyl sections, all values in Table 2 are reported as the difference between the treated and the untreated vinyl.

Gloss was measured using a Hunter Lab ProGloss 3 glossmeter. Due to the relatively low intrinsic reflectivity of the vinyl, the 85° angle setting was selected to maximize the response (typically from 5–20). Color parameters *L and *C were measured using an X-rite 948/968 spectrophotometer, computer interfaced, and equipped with the QA master software. The *L value (lightness) indicates the reflective intensity of the treated vinyl (i.e. the treated vinyl appears a darker, richer blue color). As this value typically decreases upon treatment, we report its negative value for easier graphical comparison (i.e., -*L). The *C value (chroma) gives the vividness or dullness of the color of the sample (i.e. the "blueness" of the vinyl). Additional information about these color attributes can be found in X-Rite Corporation's "A Guide to Understanding Color Communication", page 14.

TABLE 2

| | Protectant (± Standard Deviation) | | |
|---|---|---|---|
| Test | C1 | C2 | C3 |
| Change in Gloss (85°) | 5.87 ± 1.11 | 9.83 ± 1.10 | 8.43 ± 1.27 |
| -Change in *L | 8.79 ± 0.24 | 9.41 ± 0.08 | 9.15 ± 0.35 |

TABLE 2-continued

| | Protectant (± Standard Deviation) | | |
|---|---|---|---|
| Test | C1 | C2 | C3 |
| Change in *C | 5.04 ± 0.30 | 5.42 ± 0.11 | 5.12 ± 0.20 |
| Weight pick-up, mg | 5 ± 2 | 11 ± 2 | 8 ± 2 |

Protectant Concentrate Example 1

A protectant concentrate, formulated to allow further dilution giving a protectant with 10 weight percent of a 350 cSt organopolysiloxane and 1.5 percent of a UV blocker-plasticizer-HAL combination, is prepared as follows. A preblend consisting of the emulsifiers and oils is made which contains 4.75 weight percent of a secondary alcohol ethoxylate surfactant, 55.0 weight percent of a 350 cSt polydimethylsiloxane (trade name SWS101 350), 8.25 weight percent of a proprietary "HAL" UV protectant package (HAL= hindered amine light stabilizer) protectant package, and 2.5 weight percent propylene glycol. The preblend is mixed until homogeneous, then 4.75 weight percent water is charged and the resulting mixture subjected to high shear to form a water-in-oil emulsion (referred to as a "dry grease"). The remaining water (24.60 weight percent) is then slowly added with continued high shear to cause the "dry grease" to invert and form an oil-in-water emulsion. Once inverted, 0.10 weight percent of a microbicide is added, and 0.05 weight percent SE24 (defoamer). The completed emulsion is then mixed under low shear conditions to insure a uniform product. The resulting emulsion is stable with a particle size of 318±5 nm, 67.6 weight percent solids, and no separation in the centrifuge test.

Protectant Concentrate Example 2

In the same manner as described in Protectant Concentrate Example 1, an emulsion concentrate formulated to allow further dilution giving a protectant with 10 weight percent of a 1000 cSt organopolysiloxane and 1.5 weight percent of the proprietary UV blocker-plasticizer-HAL was prepared. The stable emulsion thus produced has a particle size of 352±9 nm, 67.8 weight percent solids, and centrifuge separation of less than 0.0625 inch (1.6 mm).

Protectant Concentrate Example 3

In the same manner as described in Protectant Example 1, an emulsion concentrate formulated to deliver 15 weight percent of a 350 cSt organopolysiloxane and 1.5 weight percent of the proprietary UV blockerplasticizer-HAL was prepared . The stable emulsion thus produced has a particle size of 321±7 nm, 65.4 weight percent solids, and centrifuge separation of less than 0.0625 inch (1.6 mm).

Protectant Concentrate Example 4

In the same manner as described in Protectant Example 1, an emulsion concentrate formulated to allow further dilution giving a protectant with 15 weight percent of a 1000 cSt organopolysiloxane and 1.5 weight percent of the proprietary UV blocker-plasticizer-HAL was prepared. The stable emulsion thus produced has a particle size of 321±7 nm, 65.3 weight percent solids, and centrifuge separation of less than 0.0625 inch (1.6 mm).

Protectant Concentrate Example 5

In the same manner as described in Protectant Example 1, an emulsion concentrate formulated to allow further dilution giving a protectant with 20 weight percent of a 350 cSt organopolysiloxane and 1.5 weight percent of the proprietary UV blocker-plasticizer-HAL was prepared. The stable emulsion thus produced has a particle size of 352±9 nm, 65.4 weight percent solids, and centrifuge separation of less than 0.0625 inch (1.6 mm).

Protectant Concentrate Example 6

In the same manner as described in Protectant Example 1, an emulsion concentrate formulated to allow further dilution giving a protectant with 20 weight percent of a 1000 cSt organopolysiloxane and 1.5 weight percent of the proprietary UV blocker-plasticizer-HAL was prepared. The stable emulsion thus produced has a particle size of 352±9 nm, 65.5 weight percent solids, and no separation upon centrifugation.

Protectant Examples 7–12, 10 Percent Organopolysiloxane

A series of protectants made in accordance with the present invention, containing 10 weight percent organopolysiloxane, are prepared from the emulsions described in Protectant Concentrate Examples 1 and 2 above. Detailed formulations and characterizations are listed in Tables 3 and 4 below. The protectants are made by dissolving the CARBOPOL® 940 into the desired quantity of deionized water, then adding the emulsion concentrate and mixing until the mixture is uniformly dispersed. Triethanolamine is then added to thicken the protectant, then 0.10 weight percent Troysan 395 microbicide is added and the finished protectant mixed well. Examples 7 and 8 are Comparative Examples.

TABLE 3

| COMPOSITION/PROPERTY | EXAMPLE | | | | | |
|---|---|---|---|---|---|---|
| | 7 | 8 | 9 | 10 | 11 | 12 |
| Base organopolysiloxane viscosity, cSt | 350 | 1000 | 350 | 1000 | 350 | 1000 |
| Made from Protectant Concentrate # | #1 | #2 | #1 | #2 | #1 | #2 |
| Silicone amount, weight percent | 10 | 10 | 10 | 10 | 10 | 10 |
| Protectant Concentrate weight percent | 18.18 | 18.18 | 18.18 | 18.18 | 18.18 | 18.18 |
| Water, weight percent | 81.72 | 81.72 | 81.57 | 81.57 | 81.52 | 81.52 |
| Carbopol ® 940, weight percent | 0.000 | 0.000 | 0.075 | 0.075 | 0.100 | 0.100 |
| Triethanolamine, weight percent | 0.000 | 0.000 | 0.075 | 0.075 | 0.100 | 0.100 |
| Troysan ® 395, weight percent | 0.100 | 0.100 | 0.100 | 0.100 | 0.100 | 0.100 |
| Protectant viscosity, cP | <10 | <10 | 324 | 1456 | 2220 | 2088 |

TABLE 4

| PROPERTY | EXAMPLE | | | | | |
|---|---|---|---|---|---|---|
| | 7 | 8 | 9 | 10 | 11 | 12 |
| Δ 85° Gloss | 4.53 ± 0.45 | 3.50 ± 0.60 | 6.60 ± 0.90 | 7.30 ± 0.82 | 8.17 ± 0.51 | 7.73 ± 1.17 |
| Δ-*L | 8.12 ± 0.20 | 7.65 ± 0.74 | 8.91 ± 0.14 | 8.89 ± 0.25 | 9.30 ± .04 | 9.16 ± 0.17 |
| Δ *C | 4.48 ± 0.16 | 4.11 ± 0.26 | 4.96 ± 0.12 | 5.05 ± 0.21 | 5.22 ± 0.02 | 5.12 ± 0.05 |
| Δ Weight, (mg) | 1 ± 1 | 1 ± 1 | 6 ± 1 | 6 ± 1 | 15 ± 2 | 7 ± 3 |

FIGS. 1–4 graphically compare the results tabulated in Table 4. Also included in the Figures are the results for the commercial protectants, C1–C3. As is clearly indicated in the FIGS. 1–4, the minimally thickened sprayable protectants (Examples 9–12) meet or exceed the performance of the commercial protectant, C1, in all of the measured attributes, even though it contains only 50 percent of the organopolysiloxane active ingredient. Note that the unthickened examples, Comparative Examples 7 and 8, are poorer in all measured attributes when compared to the commercial samples as is expected for a protectant with less active ingredients.

Protectant Examples 13–18, 15 Percent Organopolysiloxane

A series of protectants made in accordance with the present invention, containing 15 weight percent organopolysiloxane, are prepared from the emulsions described in Protectant Concentrate Examples 3 and 4 above. Detailed formulations and characterizations are listed in Tables 5 and 6 below. The protectants are made by dissolving the CARBOPOL® 940 into the desired quantity of deionized water, then adding the emulsion concentrate and mixing until the mixture is uniformly dispersed. Triethanolamine is then added to thicken the protectant, then 0.10 weight percent Troysan 395 microbicide is added and the finished protectant mixed well. Examples 13 and 14 are Comparative Examples.

TABLE 5

| COMPOSITION/PROPERTY | EXAMPLE | | | | | |
|---|---|---|---|---|---|---|
| | 13 | 14 | 15 | 16 | 17 | 18 |
| Base organopolysiloxane viscosity, cSt | 350 | 1000 | 350 | 1000 | 350 | 1000 |
| Made from Protectant Concentrate # | #3 | #4 | #3 | #4 | #3 | #4 |
| Silicone amount, weight percent | 15 | 15 | 15 | 15 | 15 | 15 |
| Protectant Concentrate weight percent | 27.27 | 27.27 | 27.27 | 27.27 | 27.27 | 27.27 |
| Water, weight percent | 72.63 | 72.63 | 72.48 | 7.248 | 72.43 | 72.43 |
| Carbopol ® 940, weight percent | 0.000 | 0.000 | 0.075 | 0.075 | 0.100 | 0.100 |
| Triethanolamine, weight percent | 0.000 | 0.000 | 0.075 | 0.075 | 0.100 | 0.100 |
| Troysan ® 395, weight percent | 0.100 | 0.100 | 0.100 | 0.100 | 0.100 | 0.100 |
| Protectant viscosity, cP | <10 | <10 | 168 | 200 | 1032 | 1024 |

TABLE 6

| PROPERTY | EXAMPLE | | | | | |
|---|---|---|---|---|---|---|
| | 13 | 14 | 15 | 16 | 17 | 18 |
| Δ 85° Gloss | 5.30 ± 0.92 | 5.27 ± 1.21 | 5.87 ± 1.11 | 6.70 ± 1.14 | 8.57 ± 0.87 | 8.00± 1.22 |
| Δ-*L | 8.53 ± 0.20 | 8.44 ± 0.27 | 8.79 ± 0.24 | 9.23 ± 0.13 | 9.44 ± 0.15 | 9.19 ± 0.22 |
| Δ *C | 4.72 ± 0.07 | 4.65 ± 0.12 | 5.04 ± 0.30 | 5.46 ± 0.09 | 5.36 ± 0.03 | 5.33 ± 0.05 |
| Δ Weight, (mg) | 1 ± 1 | 1 ± 1 | 5 ± 2 | 12 ± 3 | 8 ± 3 | 4 ± 2 |

FIGS. 5–8 graphically compare the results tabulated in Table 6. Also included in the Figures are the results for the commercial protectants, C1–C3. As is clearly indicated in the FIGS. 5–8, the minimally thickened sprayable protectants (Examples 15–18) meet or exceed the performance of the market leader, C1, in all of the measured attributes. Protectant Examples 15–18 also perform near the level of protectant C2, which contains nearly 30 percent organopolysiloxane (35 weight percent solids)compared to 15 weight percent for the subject invention examples. As seen in the 10 weight percent protectants of the proceeding section, a moderately thickened sprayable protectant can perform equivalently (or nearly so) at a 50 percent reduction in active materials.

Protectant Examples 19–24, 20 Percent Organopolysiloxane

A series of protectants made in accordance with the present invention, containing 20 weight percent organopolysiloxane, are prepared from the emulsions described in Protectant Concentrate Examples 5 and 6 above. Detailed formulations and characterizations are listed in Tables 7 and 8 below. The protectants are made by dissolving the CARBOPOL® 940 into the desired quantity of deionized water, then adding the emulsion concentrate and mixing until the mixture is uniformly dispersed. Triethanolamine is then added to thicken the protectant, then 0.10 weight percent Troysan 395 microbicide is added and the finished protectant mixed well. Examples 19 and 20 are Comparative Examples.

TABLE 7

| COMPOSITION/PROPERTY | COMPARATIVE EXAMPLE | | | | | |
|---|---|---|---|---|---|---|
| | 19 | 20 | 21 | 22 | 23 | 24 |
| Base organopolysiloxane viscosity, cSt | 350 | 1000 | 350 | 1000 | 350 | 1000 |
| Made from Protectant Concentrate # | #5 | #6 | #5 | #6 | #5 | #6 |
| Silicone amount, weight percent | 20 | 20 | 20 | 20 | 20 | 20 |
| Protectant Concentrate weight percent | 36.36 | 36.36 | 36.36 | 36.36 | 36.36 | 36.36 |
| Water, weight percent | 63.54 | 63.54 | 63.39 | 63.39 | 63.34 | 63.35 |
| Carbopol ® 940, weight percent | 0.000 | 0.000 | 0.075 | 0.075 | 0.100 | 0.100 |
| Triethanolamine, weight percent | 0.000 | 0.000 | 0.075 | 0.075 | 0.100 | 0.100 |
| Troysan ® 395, weight percent | 0.100 | 0.100 | 0.100 | 0.100 | 0.100 | 0.100 |
| Protectant viscosity, cP | <10 | <10 | 172 | 144 | 844 | 468 |

TABLE 8

| PROPERTY | COMPARATIVE EXAMPLE | | | | | |
|---|---|---|---|---|---|---|
| | 19 | 20 | 21 | 22 | 23 | 24 |
| Δ 85° Gloss | 9.13 ± 0.55 | 8.90 ± 0.82 | 11.09 ± 1.79 | 12.80 ± 1.61 | 11.87 ± 1.01 | 14.33 ± 0.90 |
| Δ-*L | 8.95 ± 0.34 | 9.39 ± 0.10 | 9.44 ± 0.10 | 9.57 ± 0.25 | 9.51 ± 0.18 | 9.67 ± 0.05 |
| Δ *C | 5.27 ± 0.35 | 5.30 ± 0.12 | 5.57 ± 0.02 | 5.57 ± 0.08 | 5.55 ± 0.13 | 5.63 ± 0.02 |
| Δ Weight, (mg) | 11 ± 4 | 4 ± 3 | 24 ± 6 | 17 ± 5 | 25 ± 2 | 22 ± 4 |

Figure 1:
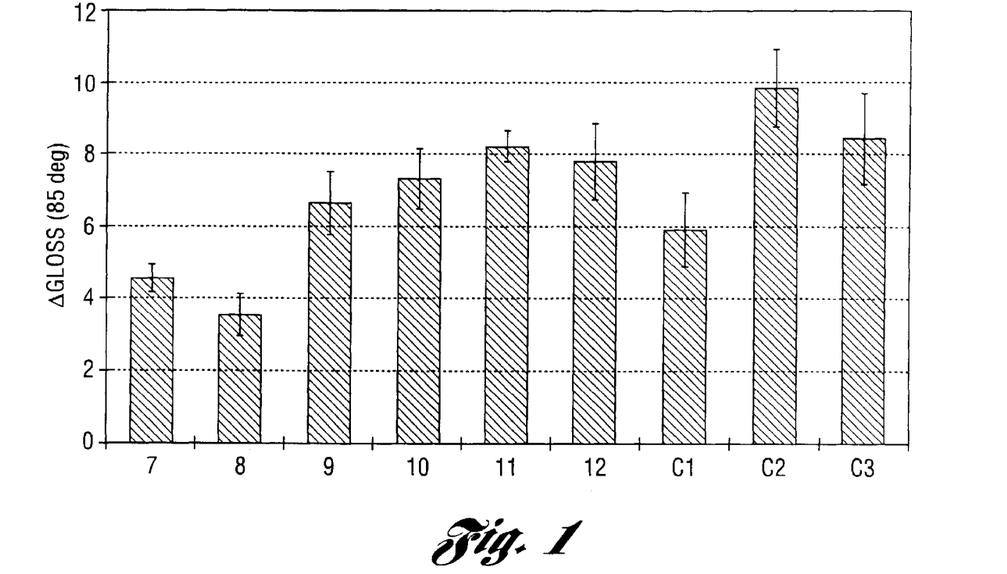
FIG. 1 illustrates the improvement in gloss obtainable through the use of the subject compositions containing 10 weight percent organopolysiloxane solids.
Figure 2:
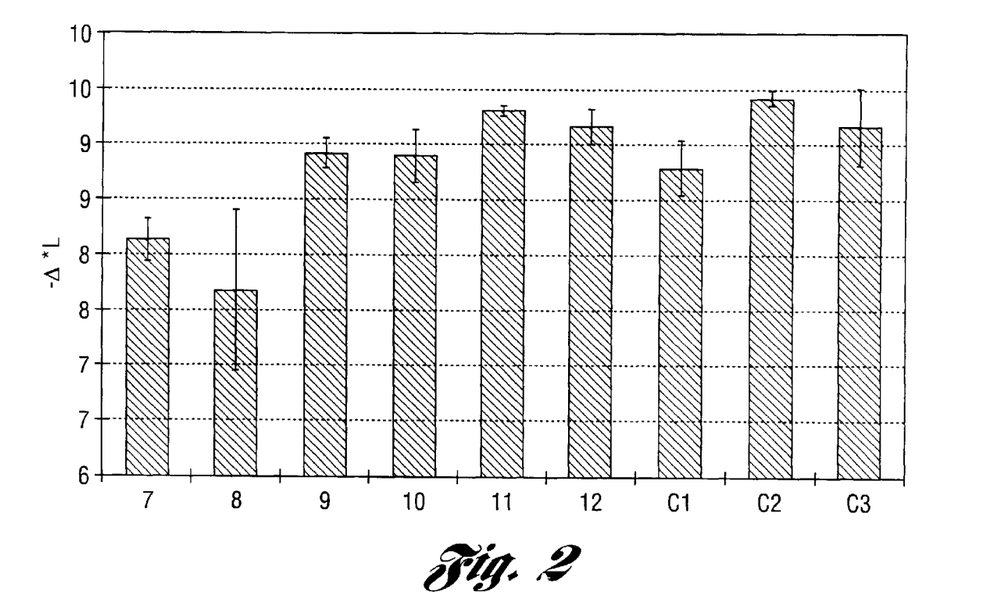
FIG. 2 illustrates the improvement in lightness, *L, obtainable through the use of the subject compositions containing 10 weight percent organopolysiloxane solids.
Figure 3:
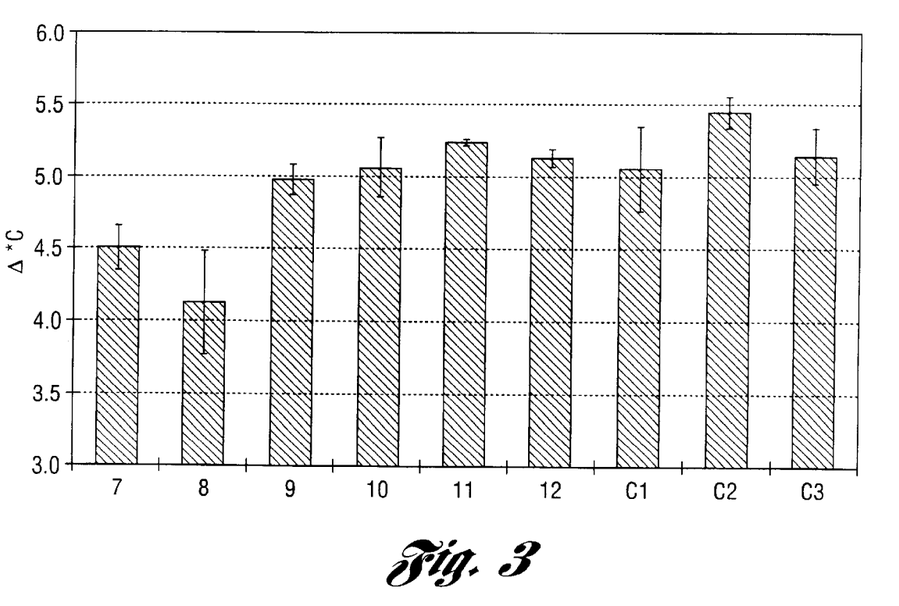
FIG. 3 illustrates the improvement in chroma, *C, obtainable through the use of the subject compositions containing 10 weight percent organopolysiloxane solids.
Figure 4:
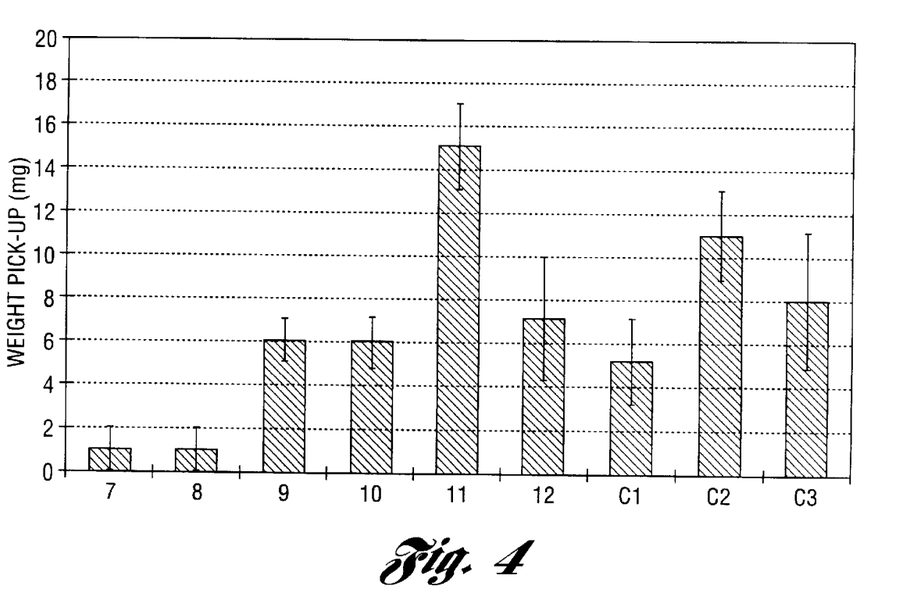
FIG. 4 illustrates the increase in weight gain by the substrate obtainable through the use of the subject compositions containing 10 weight percent organopolysiloxane solids.
Figure 5:
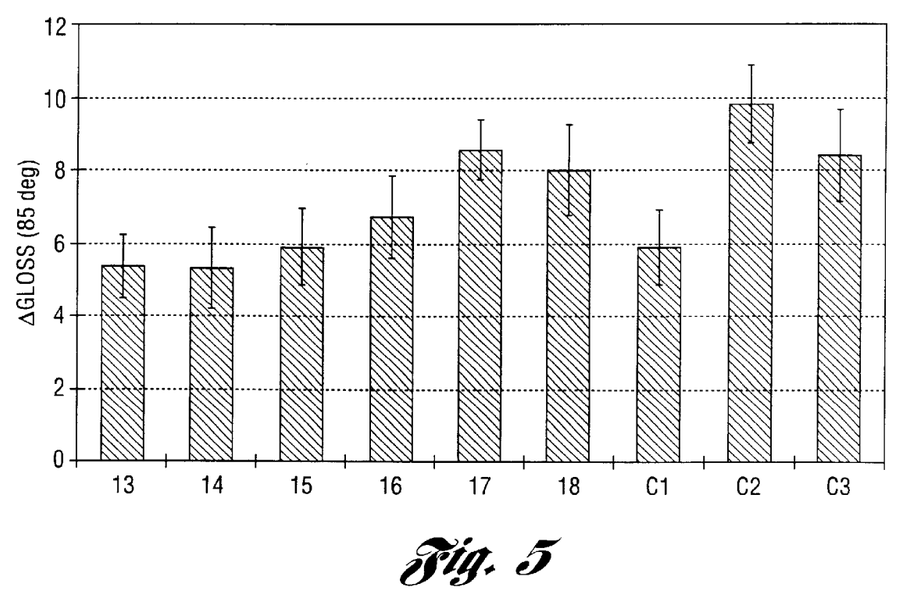
FIG. 5 illustrates the improvement in gloss obtainable through the use of the subject compositions containing 15 weight percent organopolysiloxane solids.
Figure 6:
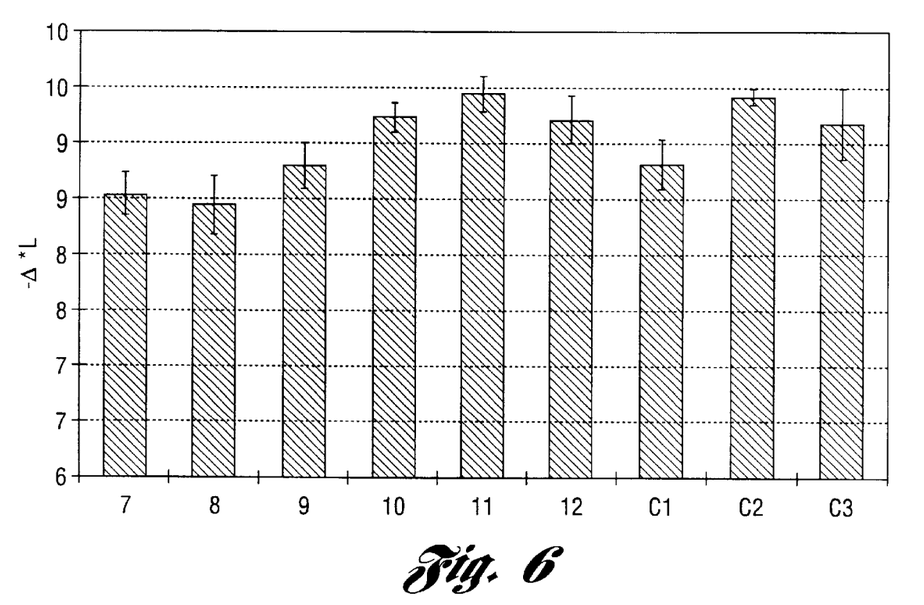
FIG. 6 illustrates the improvement in lightness, *L, obtainable through the use of the subject compositions containing 15 weight percent organopolysiloxane solids.
Figure 7:
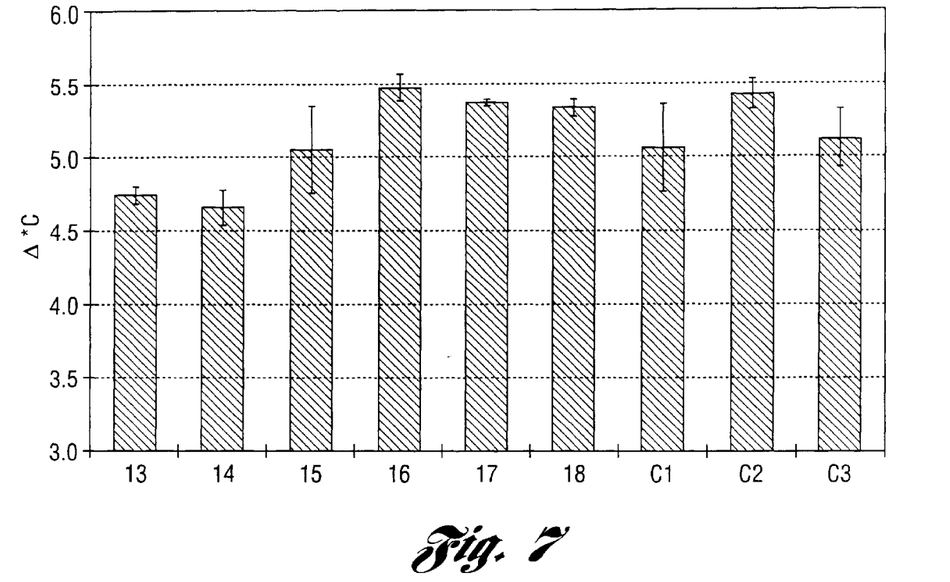
FIG. 7 illustrates the improvement in chroma, *C, obtainable through the use of the subject compositions containing 15 weight percent organopolysiloxane solids.
Figure 8:
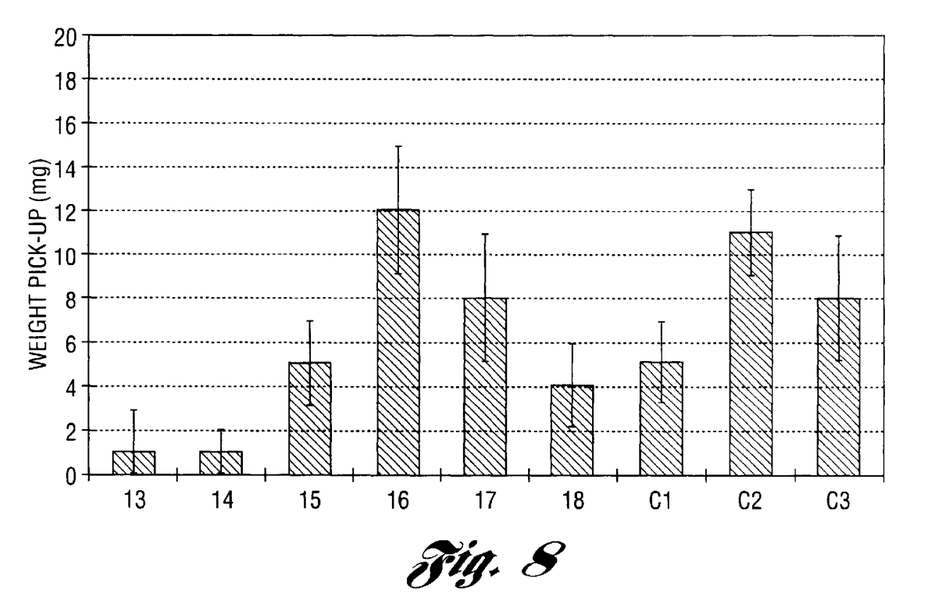
FIG. 8 illustrates the increase in weight gain by the substrate obtainable through the use of the subject compositions containing 15 weight percent organopolysiloxane solids.
Figure 9:
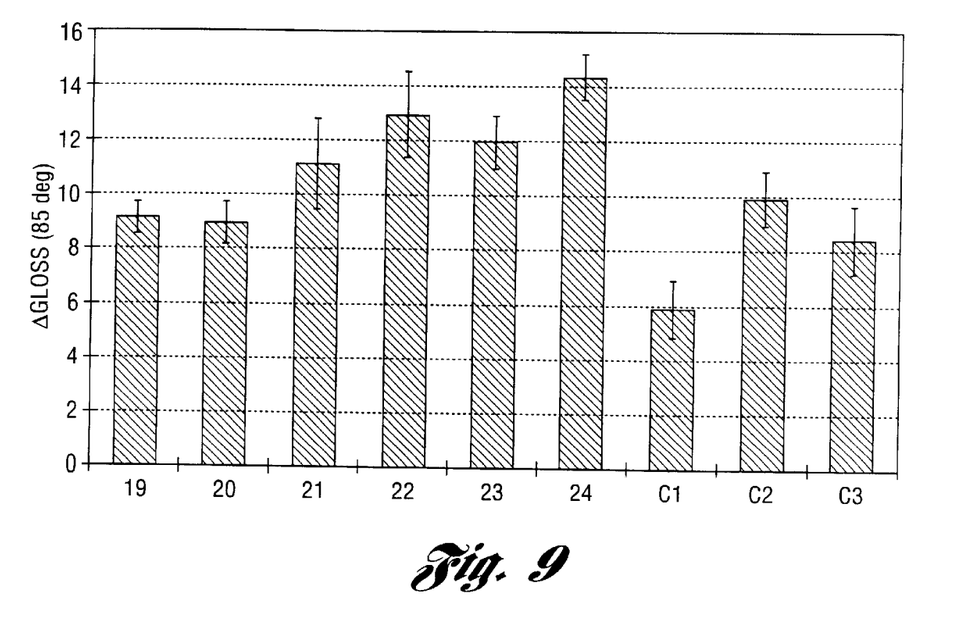
FIG. 9 illustrates the improvement in gloss obtainable through the use of the subject compositions containing 20 weight percent organopolysiloxane solids.
Figure 10:
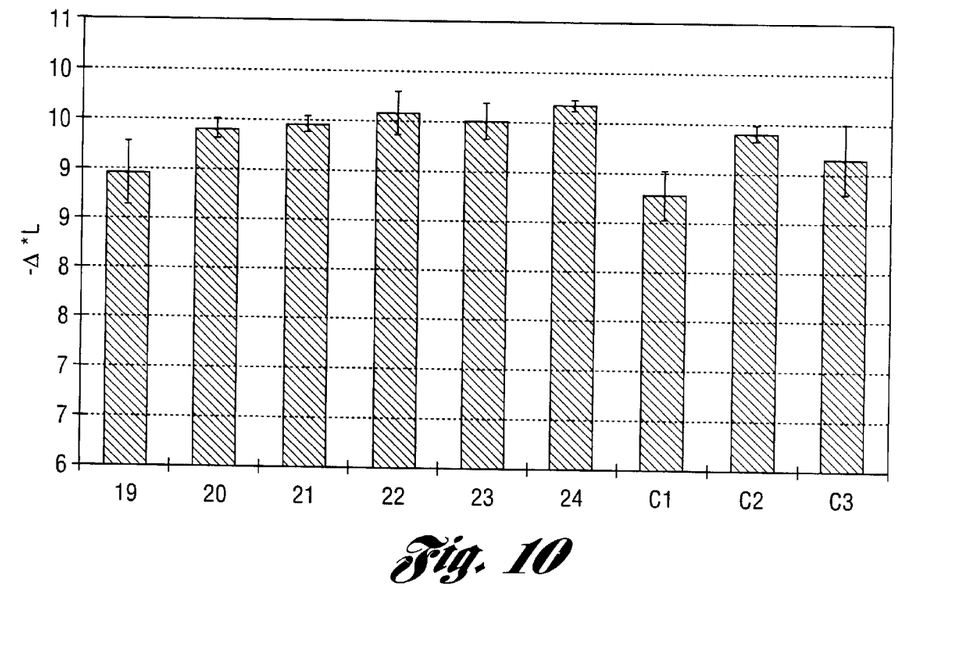
FIG. 10 illustrates the improvement in lightness, *L, obtainable through the use of the subject compositions containing 20 weight percent organopolysiloxane solids.
Figure 11:
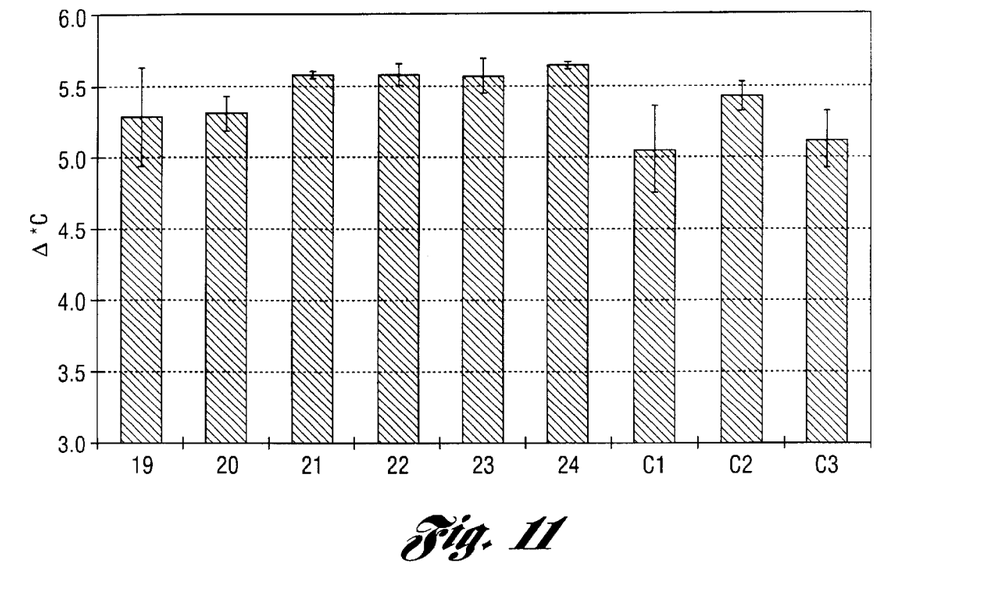
FIG. 11 illustrates the improvement in chroma, *C, obtainable through the use of the subject compositions containing 20 weight percent organopolysiloxane solids.
Figure 12:
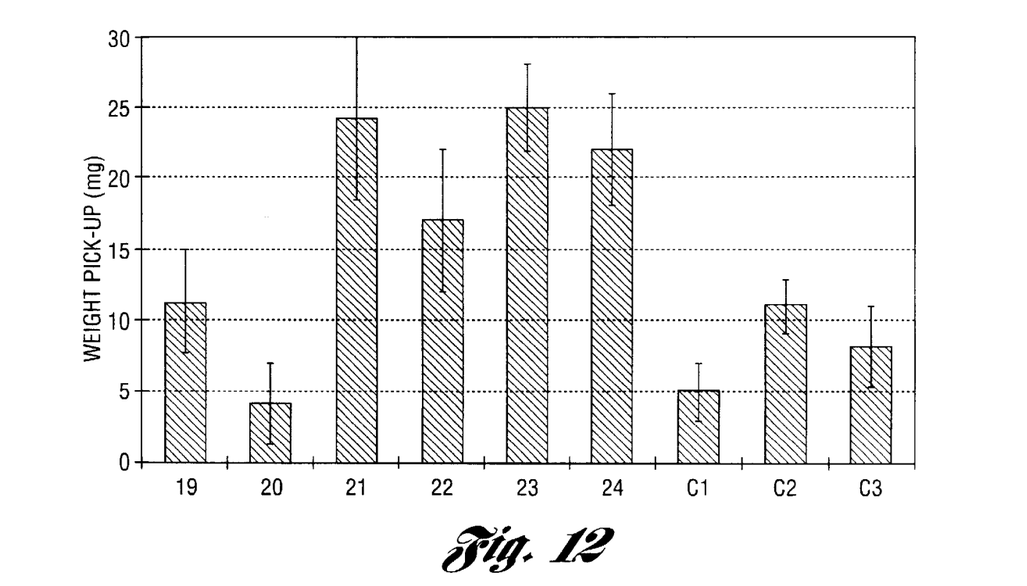
FIG. 12 illustrates the increase in weight gain by the substrate obtainable through the use of the subject compositions containing 20 weight percent organopolysiloxane solids.

FIGS. 9–12 graphically compare the results tabulated in Table 8. Also included in the Figures are the results for the commercial protectants, C1–C3. As is clearly indicated in the FIGS. 9–12, the minimally thickened sprayable protectants (Examples 21–24) meet or exceed the performance of the commercial protectants, C1–C3. Surprisingly, the inclusion of a moderate amount of a thickener, 0.075 to 0.100 weight percent, which raises the protectant to 100 to 2500 cP, results in a significant enhancement of the protectant performance even when the level of polyorganosiloxane is as much as 50 percent less than that currently used in the marketplace. The improvement in gloss shown in FIG. 9 is particularly notable in that of Example 24, with 33 percent less active material, outperforms the "gloss leader", C2, by nearly 50 percent.

By the term "improved gloss" with respect to the compositions of the subject invention is meant that the composition, when applied to vinyl fabric and buffed lightly, will exhibit an increase in gloss over the vinyl treated with the same composition less the gloss-improving additive. Relative degrees of gloss improvement ("contribution") may be monitored by measuring 85° gloss by conventional techniques. The same test may be applied to other vinyl surfaces, i.e. vinyl armrests, dashboards, and the like. The compositions of the subject invention must include necessary ingredients, i.e. water, organopolysiloxane, and gloss-improving additives, as well as any surfactants necessary to achieve a stable emulsion, i.e. one which will not exhibit marked separation under expected storage conditions, or stability similar to the formulations of C1 to C3. However, the compositions of the subject invention may optionally be formulated only with these necessary ingredients, and to the exclusion of other ingredients not mentioned herein. By the term "application medium" is meant a cloth, pad, sponge, towel, or other common means of applying and/or uniformly distributing and/or buffing a protectant during application to a substrate.

Having now fully described the invention, it will be apparent to one of ordinary skill in the art that many changes and modifications can be made thereto without departing from the spirit or scope of the invention as set forth herein.

What is claimed is:

1. A method of improving the gloss of an aqueous, sprayable organopolysiloxane automotive protectant emulsion, said method comprising increasing the viscosity of said emulsion by adding an effective viscosity increasing amount of a gloss-improving additive, the final protectant viscosity being about 50 cP to about 4000 cP, wherein said sprayable protectant has a viscosity less than 40 cP in the absence of said gloss-improving additive, and a viscosity of greater than 50 cP to about 4,000 cP in the presence of said additive.

2. The method of claim 1 wherein said gloss-improving additive causes a greater than 50% increase in viscosity.

3. A sprayable automotive protectant, said protectant comprising an aqueous dispersion of an organopolysiloxane active ingredient comprising one or more organopolysiloxane fluids, said one or more fluids individually having a neat viscosity of from about 10 cSt to about 1,000,000 cSt, said active ingredient present in an effective gloss-increasing amount of less than or equal to 20 weight percent, and an effective amount of a gloss-improving additive, said protectant having an emulsion viscosity of less than about 4,000 cP, both said emulsion viscosity of said protectant and the improvement in gloss of an elastomeric surface treated with said protectant being greater in the presence of said gloss-improving additive than in the absence of said gloss-improving additive, said gloss-improving additive selected from the group consisting of water soluble thickeners, water-insoluble inorganic thickeners, and mixtures thereof, wherein said water soluble thickener is present in an amount of up to about 1 weight percent based on the weight of the automotive protectant, and wherein said water-insoluble inorganic thickener is present in an amount of up to 2 weight percent based on the weight of the automotive protectant, wherein the viscosity of said protectant is minimally twice the viscosity of a protectant having the same composition but not containing said water soluble thickener.

4. A sprayable automotive protectant suitable for application to elastomeric surfaces, said protectant comprising a stable aqueous dispersion of an organopolysiloxane active ingredient comprising one or more organopolysiloxane fluids, said one or more fluids individually having a neat viscosity of from about 10 cSt to about 1,000,000 cSt, said active ingredient present in an effective amount of about 10 weight percent to about 20 weight percent, and an effective amount of a gloss-improving additive, said protectant having an emulsion viscosity of 50 cP to less than 4,000 cP, both said emulsion viscosity and the improvement in gloss of an elastomeric substrate treated with said protectant being greater in the presence of said gloss-improving additive than in the absence of said gloss-improving additive, said gloss-improving additive selected from the group consisting of water soluble thickeners and water-insoluble inorganic thickeners.

5. The protectant of claim 4 wherein said active ingredient is present in an amount of from about 10 weight percent to about 15 weight percent based on the total weight of said protectant.

6. The protectant of claim 4 wherein said gloss-improving additive is selected from the group consisting of neutralized or unneutralized polyacrylic polymers, neutralized or unneutralized polyacrylic/polyacrylate polymers, polyacrylamide polymers, cellulose ethers, vegetable gums, and mixtures thereof.

7. The protectant of claim 6 wherein said neutralized or unneutralized polyacrylic or polyacrylic/polyacrylate polymer is present in an amount of less than 2 weight percent solids based on the weight of the protectant.

8. The protectant of claim 4 wherein said gloss-improving additive is a water-insoluble particulate solid which increases the viscosity of aqueous organopolysiloxane emulsions.

9. The protectant of claim 4 wherein said gloss-improving additive comprises both a water soluble compound capable of increasing the viscosity of an aqueous polyorganosiloxane emulsion and a particulate solid capable of increasing the viscosity of an aqueous polyorganosiloxane emulsion.

10. The protectant of claim 4 wherein the viscosity of said protectant is from about 50 cP to about 2,000 cP.

11. The protectant of claim 4 wherein said gloss-improving additive is present in an amount of from about 0.02 weight percent to about 1.0 weight percent based on the total weight of said protectant.

12. The protectant of claim 4 substantially free of wax.

13. A sprayable automotive protectant suitable for application to an elastomeric surface, said protectant comprising a stable aqueous dispersion of an organopolysiloxane active ingredient comprising one or more organopolysiloxane fluids, said one or more fluids individually having a neat viscosity of from about 10 cSt to about 1,000,000 cSt, said active ingredient present in an effective gloss-increasing amount of less than or equal to 20 weight percent, and an effective amount of a gloss-improving additive, said protectant having an emulsion viscosity of less than about 4,000 cP, both said emulsion viscosity of said protectant and the improvement in gloss of said elastomeric surface treated with said automotive protectant being greater in the presence of said gloss-improving additive than in the absence of said gloss-improving additive, said gloss-improving additive selected from the group consisting of water soluble thickeners, water-insoluble inorganic thickeners, and mixtures thereof, wherein said thickeners are present in an amount of up to about 2 weight percent based on the weight of the automotive protectant, said organopolysiloxane fluids present in the form of an emulsion having an average particle size from about 10 nm to 800 nm.

14. The protectant of claim 13 wherein said gloss-improving additive is selected from the group consisting of neutralized or unneutralized polyacrylic polymers, neutralized or unneutralized polyacrylic/polyacrylate polymers, polyacrylamide polymers, cellulose ethers, vegetable gums, and mixtures thereof.

15. The automotive protectant of claim 13 wherein the viscosity of said protectant is at least 50 cP.

16. A sprayable automotive protectant suitable for application to an elastomeric surface to improve the gloss thereof, said protectant comprising a stable aqueous oil-in-water emulsion of one or more organopolysiloxane fluids in an effective gloss-increasing amount of less than 20 weight percent relative to the total weight of said protectant, and a gloss improving additive which comprises a water soluble organic thickener or a water insoluble inorganic thickener, said emulsion having a viscosity of less than 4000 cP, and further comprising one or more additives selected from the group consisting of
a) a plasticizer;
b) an ultraviolet light stabilizer; and
c) a low volatility aliphatic glycol.

17. The protectant of claim 16 wherein said plasticizer is present and is a plasticizer selected from the group consisting of the dialkylphthalates, triarylphosphates, epoxidized soybean oils, and mixtures thereof.

18. The protectant of claim 16 wherein said ultraviolet light stabilizer is present and comprises a hindered amine light stabilizer.

19. The protectant of claim 16 wherein said ultraviolet light stabilizer is present in an amount of from 1 to about 8 weight percent relative to the total weight of said protectant.

20. The protectant of claim 16 wherein said low volatility aliphatic glycol is present and is selected from the group consisting of ethylene glycol, propylene glycol, and glycerine.

21. A method of increasing the gloss of an elastomeric surface, said method comprising applying to said elastomeric surface the protectant of claim 1.

22. A method of increasing the gloss of an elastomeric surface, said method comprising applying to said elastomeric surface the protectant of claim 2.

23. A method of increasing the gloss of an elastomeric surface, said method comprising applying to said elastomeric surface the protectant of claim 3.

24. A method of increasing the gloss of an elastomeric surface, said method comprising applying to said elastomeric surface the protectant of claim 4.

25. A method of increasing the gloss of an elastomeric surface, said method comprising applying to said elastomeric surface the protectant of claim 5.

26. A method of increasing the gloss of an elastomeric surface, said method comprising applying to said elastomeric surface the protectant of claim 6.

27. A method of increasing the gloss of an elastomeric surface, said method comprising applying to said elastomeric surface the protectant of claim 7.

28. A method of increasing the gloss of an elastomeric surface, said method comprising applying to said elastomeric surface the protectant of claim 8.

29. A method of increasing the gloss of an elastomeric surface, said method comprising applying to said elastomeric surface the protectant of claim 9.

30. A method of increasing the gloss of an elastomeric surface, said method comprising applying to said elastomeric surface the protectant of claim 10.

31. A method of increasing the gloss of an elastomeric surface, said method comprising applying to said elastomeric surface the protectant of claim 11.

32. A method of increasing the gloss of an elastomeric surface, said method comprising applying to said elastomeric surface the protectant of claim 12.

33. A method of increasing the gloss of an elastomeric surface, said method comprising applying to said elastomeric surface the protectant of claim 13.

34. A method of increasing the gloss of an elastomeric surface, said method comprising applying to said elastomeric surface the protectant of claim 14.

35. A method of increasing the gloss of an elastomeric surface, said method comprising applying to said elastomeric surface the protectant of claim 15.

36. A method of increasing the gloss of an elastomeric surface, said method comprising applying to said elastomeric surface the protectant of claim 16.

37. A method of increasing the gloss of an elastomeric surface, said method comprising applying to said elastomeric surface the protectant of claim 17.

38. A method of increasing the gloss of an elastomeric surface, said method comprising applying to said elastomeric surface the protectant of claim 18.

39. A method of increasing the gloss of an elastomeric surface, said method comprising applying to said elastomeric surface the protectant of claim 19.

40. A method of increasing the gloss of an elastomeric surface, said method comprising applying to said elastomeric surface the protectant of claim 20.

* * * * *